UNITED STATES PATENT OFFICE 2,358,827

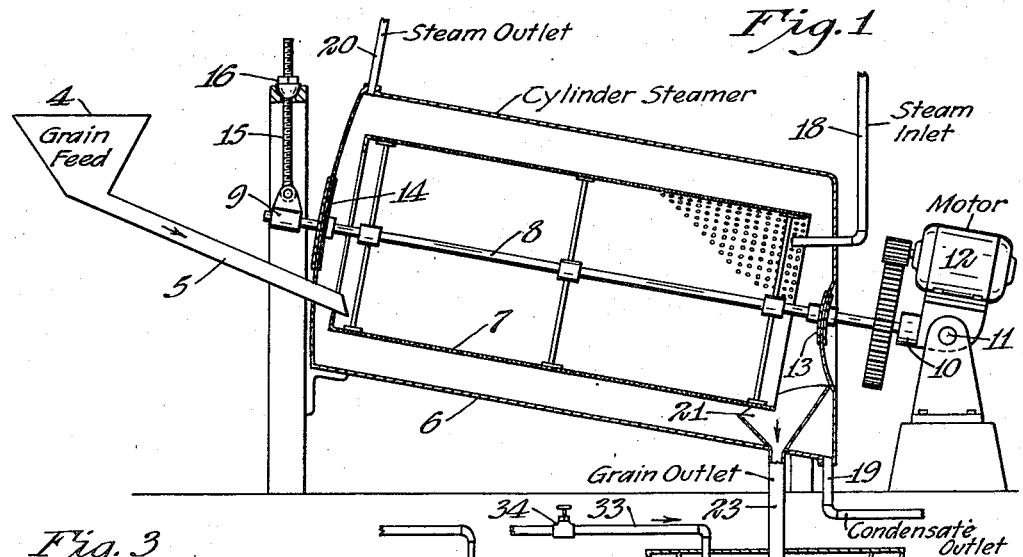
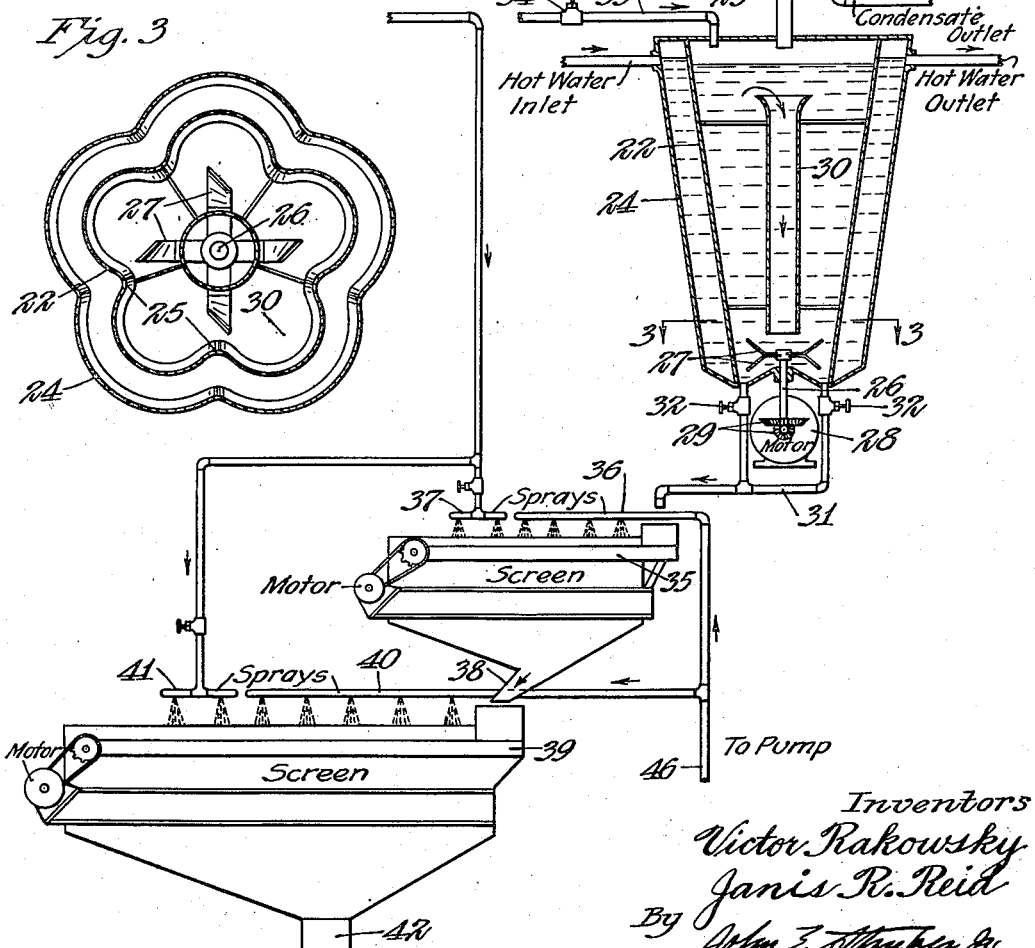

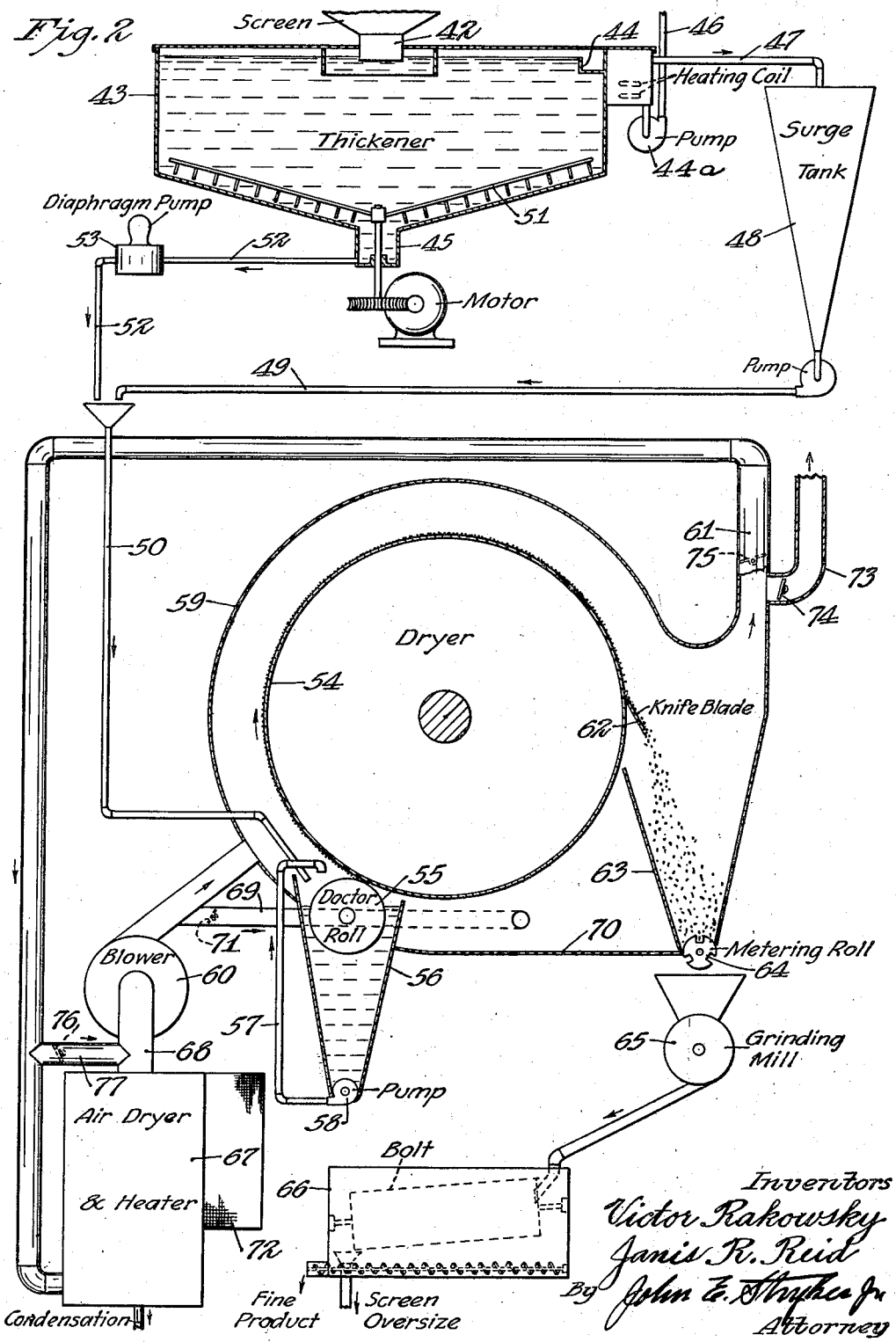

PROCESS FOR PRODUCING FLOUR

Victor Rakowsky and Janis R. Reid, Joplin, Mo.

Application April 13, 1942, Serial No. 438,688

10 Claims. (Cl. 83—42)

The principal objects of the present invention are to provide a novel and economical process for producing flour from grain whereby rapid and substantially complete separation of the bran or husk layers from the endosperm is obtained and an unusually large proportion of the principal vitamins and valuable minerals are recovered from the outer or bran layers and incorporated in a white flour product having improved baking qualities.

With these objects in view, we have discovered that the separation of the husk or bran layers of wheat and other grains may be accomplished with a minimum destruction or loss of vitamins, such as thiamine and riboflavin, by first steaming the clean grain for a short period of time and then subjecting the hot, moist and softened kernels to a pulping treatment in the presence of a considerable quantity of water and while heating the pulp and maintaining the temperature within limits which will avoid cooking or destruction of the starch, gluten, protein or vitamin constituents.

Steaming may be carried out economically by subjecting the grain to the action of low pressure or exhaust steam for a period of from five to ten minutes during which period the temperature of the grain may be maintained between 140 and 200 degrees Fahrenheit. The pulping may be accomplished in a somewhat longer period while heating and maintaining similar temperature limits. The time required for pulping is dependent in part on the type of apparatus that is used for this operation. For best results, we have found that the duration of the pulping treatment should be limited in order to minimize the breaking up of the bran or husk portions and time of exposure of the kernels to the elevated temperature, but it must be continued until the bran or husk portions have been freed from the endosperm of the kernels. By our procedure freeing of the husk portions may be obtained while the endosperm portions are reduced to particles which are small enough to pass through the openings in a fine screen or filter cloth adapted to separate substantially all of the husk particles.

Our pulping treatment is carried out in the presence of water in an amount equal to not less than two parts of water to one part of grain by weight. A considerably larger proportion of water to grain may be used but it is desirable from the standpoint of economy in the subsequent drying step to add only enough water at this stage of the process to place a large proportion of the total soluble constituents of the outer layers in solution. We also add, during the pulping, sufficient acid to produce a hydrogen ion concentration in the pulp such that the pH is approximately 5 to 6. Such acidity preserves valuable constituents and expedites the separation of the vitamins from the husk layers. The pulping is preferably carried out in a machine having high speed cutting and propelling blades which, by both cutting and beating action, rapidly separate the softened outer layers from the endosperm while reducing the latter to a fine pulp. This treatment, if properly limited and controlled, leaves the bran or husk layers in a considerably coarser flake condition than the softer endosperm particles as hereinbefore indicated.

The resulting pulp is subjected to screening or filtering treatment to separate the husk portions from the finer particles of gluten, starch and protein. Suitable vibrating screens may be used most economically for this purpose and where a maximum of the bran is to be removed, screening in stages is desirable. For example, the pulp may be fed first to a relatively coarse screen of approximately 60 mesh which will separate the coarser bran particles and then the undersize product of this screen may be fed to a finer screen of say 100 to 150 mesh size to separate particles of bran of correspondingly finer sizes.

As an alternate procedure, both pulping and screening in two or more stages is recommended where an extremely high grade white patent flour, substantially without bran or husk particles or coloring matter, is to be produced. In this case the initial or primary pulping is limited to treatment only sufficient to free the bran portions of the grain from the endosperm portion. The pulp thus obtained is treated to a fine screening operation wherein a screen of approximately 100-150 mesh may be used. This separates a portion of the minus 100-150 mesh endosperm for use as extremely high grade white patent flour. The oversize from the fine screen, consisting of husk with some coarse endosperm, is re-pulped to a finer consistency and subjected to a second screening operation wherein a screen of 100-150 mesh is used through which the remaining endosperm passes.

Vacuum filtering may be substituted for the vibrating screen treatment, but in either case the separated bran is washed to remove particles of endosperm and as much of the soluble mineral and vitamin constituents as possible. For this purpose wash sprays may be directed upon the bran while it is supported on the screen or filter.

The wash water is collected and preferably mixed with the endosperm pulp. This mixture contains more than 80% of the total vitamins from the grain, including from 80% to 85% of the thiamine and approximately 70% of the riboflavin, together with a considerable quantity of the soluble minerals extracted from the husk layers by our treatment.

Irrespective of whether the husk portions are separated by a single or by a multiple stage treatment, the undersize pulp from the screen or filter is dried to obtain a flour product containing between 3% and 10% moisture (or complying with Government specifications applicable thereto) and the bulk of the soluble vitamin and mineral salts of the grain. The drying may be performed by the use of suitable apparatus of various types, but it is important to maintain the temperature of the product during the drying within safe, low limits. Depending on the period required for the drying, the temperature of the product should not exceed a maximum of from 150 to 200 degrees Fahrenheit. The drying is conducted, preferably at atmospheric pressure, by the use of a roll type of dryer supplemented by hot air currents. Finally, the dried flour is sifted, bolted or screened to obtain suitable uniformity in the sizes of the particles and in some cases the coarser particles may be ground to the desired flour finenesses of about 100 to 150 mesh.

Machines suitable for carrying out our invention are shown in the accompanying drawings in which:

Figure 1 is a diagrammatic illustration of the steaming, pulping and screening machines arranged to perform the corresponding steps of our process and with the steaming and pulping machines shown in central vertical section;

Fig. 2 is a similar view illustrating apparatus for completing our process, including the thickening and drying of the endosperm pulp, and Fig. 3 is a horizontal section through the pulping machine taken on the line 3—3 of Fig. 1.

Preparatory to treatment according to the present invention, the grain must be thoroughly cleaned and separated from contaminating foreign matter by suitable treatment such as that described and claimed in the application of Victor Rakowsky, Serial No. 432,468, filed February 26, 1942, for Process for treating wheat and similar food products. The clean grain is delivered into a hopper 4 from which it flows through a chute 5 into our steaming apparatus. As illustrated in Fig. 1, the machine has a casing 6 supported on a suitable frame and containing a cylindrical receptacle or drum 7 disposed with its axis at an incline and adapted to be rotated about its axis. The periphery of the drum 7 comprises a fine screen or foraminous material adapted to support the grain on its inner surface and to obtain maximum exposure of the kernels to the steam contained in the casing 6. An axial shaft 8 supports the drum 7 and is provided at its upper end with a vertically adjustable bearing 9 and at its lower end with a bearing 10 supported on a horizontally extending pivot shaft 11. A motor 12 is also supported on the shaft 11 and is connected to the shaft 8 by suitable speed reducing gearing whereby the drum 7 may be slowly and continuously revolved during the steaming operation. Where the shaft 8 passes through the end walls of the casing 6, the latter are slotted vertically to permit adjustment of the angle of the shaft and the slots are closed by caps 13 and 14 which move with the shaft. The incline of the shaft 8 may be adjusted by turning a screw shaft 15 supporting the bearing 9, the shaft 15 being threaded in a nut 16 which is revoluble on the machine frame.

Low pressure steam may be fed into the casing 6 through a pipe 18 and the condensate may be discharged through an outlet pipe 19. Such steam as is not condensed within the casing may be discharged through an outlet pipe 20 and used for heating the water for the pulping machine or for other purposes. In operation, the grain which is fed from the chute 5 into the upper end of the drum 7 is continuously agitated and exposed to the steam while it is worked toward the lower end of the drum from which it is finally discharged into an outlet hopper 21. By suitable regulation of the speed of the drum and angle of its inclination, the grain may be steamed for the required period of time while passing continuously through the machine. As hereinbefore indicated, the period of steaming should not substantially exceed five minutes while the temperature of the grain in the steamer is maintained between 140 and 200 degrees Fahrenheit.

The hot, moist and softened kernels are immediately delivered into a tank 22 of a pulping machine, the grain passing through a conduit 23 connecting the bottom of the hopper 21 with the top of the tank 22. Sufficient warm water is also fed to the tank 22 to form with the grain a fluid mass. The tank 22 has a jacket 24 spaced outward from the walls of the tank so that hot water may be circulated in the jacket space for maintaining the grain at the desired temperature during the pulping treatment, suitable inlet and outlet connections for the hot jacket water being provided. The top of the tank 22 is preferably closed and the walls converge downward and are preferably of fluted shape, in horizontal cross section, with reentrant ridges 25, as indicated in Fig. 3. Mounted centrally in the bottom of the tank is a shaft 26 upon the upper end of which propelling and cutting blades 27 are mounted. These blades are driven at a high rate of speed by an electric, variable speed motor 28 connected to the shaft 26 by suitable gears 29. Mounted concentrically above the shaft 26 is a pipe 30 having an open lower end located a short distance above the blades 27 and an open upper end near the top of the tank. A pulp discharge pipe 31 is connected to the bottom of the tank 22 and has branches provided with control valves 32. To supply additional water for forming the pulp, a pipe 33 communicates with the top of the tank 22 and is provided with a control valve 34. We prefer to supply the pipe 33 with warm water (containing a small amount of pulp) from the overflow of the thickener 43 hereinafter described. Otherwise it may be supplied from the condensate pipe 19, after filtering to remove impurities, or from a source of fresh water. A small quantity of acetic or other suitable acid may be fed into the top of the tank 22 to maintain the pH of the batch within the approximate range of 5 to 6, as hereinbefore indicated.

To obtain thorough and uniform pulping, we prefer to conduct this treatment as a batch operation. For each batch the charge of steamed grain, together with an additional quantity of warm water amounting to not less than two parts of water to one part of grain by weight, is fed into the tank 22 and the motor 28 is operated to rotate the blades 27 at the required high rate of speed. These blades 27 gradually reduce the kernels of grain to a pulp which is propelled repeatedly in a circuit from the blades, outward against the walls 22, upward between the ridges 25 to the top of the tank, thence downward through the pipe 30 to the blades. The temperature of the grain is maintained between 140 and 200 degrees Fahrenheit during the pulping treatment by circulating water in the jacket 26. The requisite heat is generated, at least in part, by the pulping action of the blades 27 on the grain. This operation is continued until the endosperm portions of the kernels have been reduced to the desired fineness while the bran or husk portions remain in the form of flakes or particles of larger sizes. We have found that this treatment may be completed in a period of from ten minutes to half an hour in a machine of the character described, after our preliminary steaming of the grain.

Upon completion of this step of our process, the speed of the blades 27 is preferably greatly reduced and the valves 32 are opened to drain the pulping tank through the pipe 31. This pipe may be arranged to feed a screen or filter adapted to separate the bran or husk particles from the endosperm pulp. As shown in Fig. 1, the pipe 31 is arranged to feed a vibrating screen 35 having a screen deck of suitably fine mesh to accomplish the desired separation. Where the screening is to be carried out in two stages, the screen 35 may be provided with a deck of approximately 50 mesh so that this screen will separate only the coarser particles of grain bran or husk. Such bran or husk particles are washed free of endosperm pulp by sprays from pipes 36 and 37 and are discharged from the left of the screen (Fig. 1). To minimize the dilution of the pulp, the water for the spray pipe 36 may be collected from the pulp thickener hereinafter described and clear water may be used in the final or finishing sprays 37 only.

The undersize from the screen 35, comprising substantially all of the endosperm pulp together with some of the finer particles of bran, is collected and fed through a conduit 38 to a fine screen 39 adapted to separate the fine bran particles. This screen may be provided with a deck having openings of from 100 to 150 mesh, depending upon the fineness of the pulp. The fine bran particles are subjected to sprays from pipes 40 and 41 successively and after being washed by the latter are collected for use as food for human or animal consumption. The fine endosperm pulp which passes through the openings in the screen 39 is collected and fed through a conduit 42, either directly to the dryer, or first to a thickener and then to the dryer. For best results we have found that hot water (140-180 degrees F.) should be used in the several sprays 36, 37, 40 and 41.

As shown in Fig. 2, the pulp from the conduit 42 may be fed to a thickener tank 43 having a launder or overflow 44 and an outlet sump 45 for the thickened pulp. The relatively dilute pulp received from the conduit 42 is allowed to stand in the large tank 43 for a sufficient period of time so that the bulk of the endosperm solids settle to the bottom of the tank while the bulk of the water, together with a small amount of the pulp, is collected from the overflow 44. A pump 44a may be arranged to force this overflow liquid through a pipe 46 having branches comprising the spray pipes 36 and 40 shown in Fig. 1 and another branch connected to or comprising the pipe 30. The liquid in excess of that required for the sprays is conducted through a pipe 47 to a surge tank 48 and from this tank through pipes 49 and 50 to the pulp dryer. It will be understood that the fresh water supplied to the spray pipes 37 and 41 represents the total water added subsequently to the pulping that must be disposed of in the dryer if substantially all of the soluble constituents of the grain are to be recovered in the flour product. Suitable mechanism is provided for working the thickened pulp into the outlet sump 45. As illustrated, the thickener tank 43 has a conical bottom and rake arms 51 are slowly revolved close to the bottom to work the pulp toward and into the outlet sump 45. From this sump, pipes 52 and a diaphragm pump 53 discharge the pulp into the pipe 50 extending to the dryer.

The dryer illustrated in Fig. 2 has a large drum 54 mounted with its axis disposed horizontally and provided with means for rotating it slowly about its axis. The pulp to be dried is distributed uniformly on the periphery of the drum 54 by a doctor roll 55 which is partially submerged in the pulp in a tank 56. This tank is fed through the pipe 50. To maintain uniform pulp consistency the contents of the tank 56 are continuously circulated from the bottom to the top through a pipe 57 and pump 58. The drum 54 is continuously heated by circulating hot water or air therein so that the periphery is maintained at a temperature of approximately 180 degrees Fahrenheit. The drum is preferably enclosed within a casing 59 which is continuously supplied with heated air from a blower 60 actuated by a variable speed motor. Air from this blower is circulated around the dryer and passes out of the casing 59 through a conduit 61. A blade 62 is arranged to remove the dried endosperm solids from the periphery of the dryer and from this blade the product falls into a hopper 63 from which it is discharged by a metering roll 64.

Ordinarily, to produce flour of uniform fineness, the product of the dryer must be ground and sifted. As indicated, it may be passed through a grinding mill 65 and thence to sifting apparatus or a bolt machine 66 of suitable construction. The screen oversize is returned to the grinding mill. To conserve heat it may be desirable to return or recirculate all or a part of the air from the outlet conduit 61 to the blower 60 after drying it and heating it. Thus the conduit 61 may be arranged to supply the air to suitable heating and drying apparatus indicated by the numeral 67 and the blower 60 may be supplied with air from the latter through a conduit 68.

A branch 69 of the blower outlet conduit is arranged to supply some air under pressure to a chamber 70 beneath the roll 54. This chamber communicates with the main casing along the upper edge of the hopper 63 so that some of the drying air is directed through the particles of endosperm as they fall from the knife blade 62. The amount of air which is diverted through the conduit 69 may be controlled by a damper 71. Fresh air is supplied to the blower intake through a filter chamber 72 communicating with the heater 67 and a branch 73 of the conduit 61 is provided to allow the air to be discharged to the atmosphere or to conduct it to a bag house or cyclone separator adapted to recover particles of flour therefrom. Dampers 74 and 75 are arranged to control the flow of air through the conduits 73 and 61 respectively. Recirculated air from the conduit 61 may be by-passed, relative to the air dryer and heater 67, through a pipe 76 connecting the conduit 61 directly with the conduit 68 under control of a damper 77. It will be understood that in operation some fresh air must be drawn in through the filter 72 to replace the air that is lost through leakage and that which is entrained with the product.

The air which is circulated through the dryer casing 59 may be maintained at a temperature somewhat above the boiling point of water, for example from 215 to 280 degrees Fahrenheit. Due to the presence of the moisture in the pulp and the short period of time to which the pulp is subjected to this elevated temperature, the nutrient vitamin constituents of the flour are not materially or adversely affected by the drying.

Since light tends to destroy the vitamin, riboflavin, and may possibly have a detrimental effect on some of the other vitamins, we exclude light from the pulp as far as possible throughout our process. As illustrated in the drawings, our steaming, pulping, thickening and drying machines are all covered to exclude light. The screens or filter for separating the husk particles from the endosperm and other apparatus used in the process should also be covered by suitable protective shields or operated in a darkened room.

It will be understood that other machines and apparatus may be substituted for the specific types hereinbefore described within the scope of our invention as defined in the appended claims. Our entire process may be made to operate continuously by utilizing a plurality of batch pulping machines which are alternately run to reduce a batch of grain to pulp while other pulping machines are being charged and discharged. As hereinbefore indicated, one or more stages of screening and pulping may be employed to eliminate substantially all of the bran particles which discolor the finished product and bleaching by known methods may be resorted to to obtain a white, patent flour of high quality. A maximum of the soluble vitamins and mineral constituents of the husk or bran layers of the grain are carried into the pulp in solution by our process and these valuable constituents are concentrated in the dry flour product.

Having described our invention, what we claim as new and desire to protect by Letters Patent is:

1. The process for producing flour from grain which comprises moistening and softening the grain, reducing the softened grain to a pulp in the presence of not less than two parts of water to one part of grain by weight, while reducing the endosperm portion to a finer consistency than the husk portions thereof, separating the husk portions from the fluid endosperm pulp, washing the separated husk portions, recovering the wash water containing soluble constituents of the grain, mixing said wash water with the endosperm pulp and drying said pulp mixture to produce a flour which is rich in vitamins and soluble mineral constituents of the grain.

2. The process for producing flour from grain which comprises first moistening and softening the grain, then reducing the softened grain to a pulp in the presence of not less than two parts of water to one part of grain by weight, while reducing the endosperm portion to a finer consistency than the husk portions thereof, adding sufficient acid to obtain a hydrogen ion concentration in the pulp such that the pH thereof is approximately 5 to 6, separating the husk portions from the fluid endosperm pulp, and drying said endosperm pulp to produce a flour which is rich in vitamins and soluble mineral constituents of the grain.

3. The process for producing flour from grain which comprises first moistening and softening the grain, then reducing the softened grain to a pulp in the presence of not less than two parts of water to one part of grain by weight, while reducing the husk portions thereof to particle sizes larger than 100 mesh and the endosperm portion to particles of finer sizes, maintaining the pH of the pulp approximately 5 to 6, separating the husk portions from the fluid endosperm pulp by screening and washing, and drying the screen undersize pulp and wash water to produce a flour which is rich in vitamins and soluble mineral constituents of the grain.

4. The process for producing flour from grain which comprises first steaming the grain for a period of time not to exceed ten minutes, reducing the hot, steamed grain to a pulp in the presence of not less than two parts of water to one part of grain by weight, while reducing the endosperm portion to a finer consistency than the husk portions thereof, separating the husk portions from the fluid endosperm pulp, washing the separated husk portions, recovering the wash water containing soluble constituents of the grain, mixing said wash water with the endosperm pulp and drying said pulp mixture to produce a flour which is rich in vitamins and soluble mineral constituents of the grain.

5. The process for producing flour from grain which comprises reducing the grain to a pulp in the presence of not less than two parts of water to one part of grain while excluding light therefrom and reducing the endosperm portions to a finer consistency than the husk portions thereof, then separating the husk portions of the grain from the pulped endosperm portions thereof and continuing the substantial exclusion of light from the pulp while drying the separate endosperm pulp to produce a flour which is rich in the vitamin constituents of the grain.

6. In a process for producing flour from a cereal product comprising vitamin-carrying husk portions and integral endosperm portions, the steps of reducing the cereal product to a pulp in the presence of not less than two parts of water to one part of cereal product while freeing the husk portions from the endosperm portions and reducing the latter to a finer consistency than the husk portions, then separating the respective portions, thereafter drying the separate endosperm pulp and producing therefrom a flour which is rich in vitamin constituents of the cereal.

7. In a process for producing flour from a cereal product comprising vitamin-carrying husk portions and integral endosperm portions, the steps of reducing the cereal product to a pulp in the presence of not less than two parts of water to one part of cereal product while reducing the endosperm portions to a finer consistency than the husk portions, then separating the husk portions from the finely divided endosperm portions, washing the husk portions, recovering the wash water containing soluble constituents of the cereal product, mixing the recovered wash water with the endosperm pulp, thereafter drying the pulp mixture and producing therefrom a flour which is rich in vitamin constituents of the cereal.

8. In a process for producing flour from a cereal product comprising vitamin-carrying husk portions and integral endosperm portions, the steps of feeding the cereal product and a liquid to a tank in the proportions of not less than two parts of liquid to one part of cereal product, violently agitating the mass in the tank to free the husk portions from the endosperm portions while reducing the latter portions to a finer consistency than the husk portions, then separating the husk particles from the endosperm pulp, thereafter drying the said pulp and producing therefrom a flour which is rich in vitamin constituents of the cereal.

9. In a process for producing flour from a cereal product comprising vitamin-carrying husk portions and integral endosperm portions, the steps of feeding said product together with not less than two parts of liquid to one part of cereal product to a tank, revolving blades at a high speed in said tank, directing the mass in a circuit and repeatedly into contact with said blades until substantially all of the endosperm portions have been freed from the husk portions, leaving the bulk of the latter in particles of substantially larger size than the endosperm particles, then separating the husk particles from the endosperm pulp, thereafter drying the separate endosperm pulp and producing therefrom a flour which is rich in vitamin constituents of the cereal.

10. In a process for producing flour from a cereal product comprising vitamin-carrying husk portions and integral endosperm portions which comprises the steps of reducing the cereal product to a pulp in the presence of not less than two parts of water to one part of cereal product while reducing the endosperm portions to a finer consistency than the husk portions, adding sufficient acid so that the pH of the pulp is approximately 5-6, then separating the husk portions from the finely divided endosperm portions and finally drying the separate endosperm pulp to produce a flour which is rich in vitamin constituents.

VICTOR RAKOWSKY.
JANIS R. REID.